(12) United States Patent
Cavalieri et al.

(10) Patent No.: US 8,487,045 B2
(45) Date of Patent: *Jul. 16, 2013

(54) PRESSURE PIPES AND POLYOLEFIN COMPOSITION FOR THE MANUFACTURE THEREOF

(75) Inventors: Claudio Cavalieri, Ferrara (IT); Monica Galvan, S.M. Maddalena (IT); Enrico Beccarini, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/139,473

(22) PCT Filed: Dec. 24, 2009

(86) PCT No.: PCT/EP2009/067925
§ 371 (c)(1),
(2), (4) Date: Jun. 13, 2011

(87) PCT Pub. No.: WO2010/072841
PCT Pub. Date: Jul. 1, 2010

(65) Prior Publication Data
US 2011/0245427 A1    Oct. 6, 2011

Related U.S. Application Data

(60) Provisional application No. 61/204,701, filed on Jan. 9, 2009.

(30) Foreign Application Priority Data

Dec. 24, 2008  (EP) .................................... 08172924

(51) Int. Cl.
B29C 47/00 (2006.01)
C08L 23/14 (2006.01)

(52) U.S. Cl.
USPC .......................................... 525/191; 525/240

(58) Field of Classification Search
USPC .................................................. 525/191, 240
See application file for complete search history.

(56) References Cited

U.S. PATENT DOCUMENTS

| | | |
|---|---|---|
| 4,399,054 A | 8/1983 | Ferraris |
| 7,572,860 B2 * | 8/2009 | De Palo et al. ............... 525/191 |
| 2007/0196608 A1 | 8/2007 | De Palo et al. |

FOREIGN PATENT DOCUMENTS

| | | |
|---|---|---|
| EP | 0045977 | 8/1981 |
| EP | 0361493 | 11/1994 |
| EP | 728587 | 8/1996 |
| EP | 782587 | 7/1997 |
| EP | 0395083 | 11/1997 |
| EP | 1344793 | 6/2006 |
| WO | WO-0063261 | 10/2000 |
| WO | WO-2005014713 | 2/2005 |
| WO | WO-2005040271 | 5/2005 |

* cited by examiner

Primary Examiner — Nathan M Nutter

(57) ABSTRACT

Articles, particularly pressure pipes, having high strength as well as high stiffness and very good impact resistance even at low temperatures can be obtained by using a heterophasic polyolefin composition comprising (percent by weight) 70-90% of a random copolymer of propylene with 0.5-6% of 1-hexene, and 10-30% of a polymer of ethylene with a $C_3$-$C_{10}$ α-olefin and optionally a diene, wherein the polymer of ethylene has an ethylene content higher than 45% and an intrinsic viscosity [η] value from 3 to 5 dl/g.

A particular advantage of the present invention is that articles comprising the above heterophasic polyolefin composition show a low ductile to brittle transition temperature (DBTT).

8 Claims, No Drawings

PRESSURE PIPES AND POLYOLEFIN COMPOSITION FOR THE MANUFACTURE THEREOF

This application is the U.S. national phase of International Application PCT/EP2009/067925, filed Dec. 24, 2009, claiming priority to European Application 08172924.6 filed Dec. 24, 2008 and the benefit under 35 U.S.C. 119(e) of U.S. Provisional Application No. 61/204,701, filed Jan. 9, 2009; the disclosures of International Application PCT/EP2009/067925, European Application 08172924.6 and U.S. Provisional Application No. 61/204,701, each as filed, are incorporated herein by reference.

The present invention relates to pipes, particularly pressure pipes, made of a heterophasic polyolefin composition. More particularly, the present invention is concerned with mono- or multi-layer pressure pipes having a good balance of mechanical properties.

The invention further concerns a heterophasic polyolefin composition for the manufacture of a variety of articles, in particular shock-resistant articles, such as bumpers or pipes, including pressure pipes.

Articles made from such heterophasic polyolefin composition and their related methods of manufacture are also comprised within the scope of the present invention.

Polymer materials are frequently used for manufacturing pipes for various purposes, such as fluid transport, during which the fluid may be non-pressurised or pressurised. Pressure pipes are used when the fluid, e.g. water or natural gas, is pressurized. Pressure pipe resins require high stiffness (creep rupture strength), combined with a high resistance against slow crack growth as well as resistance to rapid crack propagation (impact toughness).

In pressure pipes, the transported fluid may have varying temperatures, usually within the range of about 0° C. to about 70° C. Such pipes are typically made of polyolefins, usually polyethylene or polypropylene. The temperatures in e.g. a hot water pipe, typically used for plumbing and heating purposes, range from 30° C. to 70° C. which means that the pipe must be able to withstand a higher temperature than that for a secure long term use. The good thermal resistance of polypropylene compared with other polyolefins is particularly useful for applications such as hot water pipes as mentioned above.

At the same time, pressure pipes may be deployed outdoor, e.g. as underground pipes. Hence it is important that they are able to maintain good mechanical and impact properties even at low temperatures, so that to efficiently withstand cold weather conditions.

WO-A1-2005/014713 discloses articles, in particular mono- or multi-layer non-pressure pipes, comprising a heterophasic polyolefin composition comprising (1) 65-95% of a crystalline propylene polymer insoluble in xylene at ambient temperature in an amount over 85% and having a polydispersity index ranging from 4 to 13 and an intrinsic viscosity value ($[\eta]_1$) of over 2.2 dl/g, and (2) 5-35% of an elastomeric olefin polymer of ethylene with a $C_3$-$C_{10}$ α-olefin having an ethylene content ranging from 15 to 85% and an intrinsic viscosity value ($[\eta]_2$) of at least 1.4 g/ml. In the examples given, the crystalline propylene polymer (1) is a propylene homopolymer.

Although the polyolefin composition disclosed by WO-A1-2005/014713 is said to impart good mechanical properties, it is clearly pointed out that such a composition is specifically aimed at non-pressure pipe applications, where stiffness and impact toughness requirements are less stringent than in the case of pressure pipes.

WO-A1-2005/040271 relates to pressure pipes comprising a resin formed from (1) 70 to 90 wt % of a random copolymer comprising units of propylene and from 0.2 to 5 wt % of units of a $C_2$-$C_{10}$ α-olefin, having an MFR of 0.1-5 g/10 min, and (2) 10 to 30 wt % of an elastomer comprising units of propylene and from 30 to 55 wt % of units of ethylene. The MFR of the resin is from 0.1 to 2 g/10 mins. In the examples, the random copolymer of propylene (1) comprises units of 1-hexene and the ethylene content in the elastomer (2) is equal to 45 wt %.

Although the pressure pipes of the kind disclosed in WO-A1-2005/040271 show overall good mechanical properties at room and high temperatures, their performance at low temperatures could be improved.

Thus, it is an object of the present invention to provide polyolefin pressure pipes having excellent mechanical performances and impact properties even at low temperatures.

Specifically, an object of the present invention is to provide polyolefin pressure pipes having a ductile to brittle transition temperature (DBTT) lower than prior art polyolefin pressure pipes. The ductile to brittle transition temperature (DBTT) defines, for a given set of conditions, the temperature at which an object, e.g. a polyolefin pressure pipe, transitions from a predominantly ductile mode of failure to a predominantly brittle mode of failure. The lower is the DBTT, the better a pressure pipe is able to preserve good impact properties even at low temperatures.

The applicant has now surprisingly found that pipes with high strength as well as high stiffness and very good impact resistance even at low temperatures, which are thus suitable for use as pressure pipes, can be obtained by using a heterophasic polyolefin composition comprising (percent by weight referred to the sum of components 1) and 2)):

1) 70-90% of a random copolymer of propylene with 0.5-6% of 1-hexene,
2) 10-30% of a polymer of ethylene with a $C_3$-$C_{10}$ α-olefin and optionally a diene,
wherein the polymer of ethylene has an ethylene content higher than 45% wt and an intrinsic viscosity [η] value from 3 to 5 dl/g.

An advantageous feature of the present invention is that pressure pipes comprising the above heterophasic polyolefin composition have a ductile to brittle transition temperature (DBTT) which is significantly lower than prior art polyolefin pressure pipes.

The above heterophasic polyolefin composition can also be used for the manufacture of articles other than pipes, such as shock-resistant articles that need to exhibit good mechanical properties even at low temperatures, e.g. car bumpers and the like.

In general, articles (including pipes) made of the heterophasic polyolefin composition of the invention show excellent mechanical properties, like creep resistance which can be coupled with good optical properties like haze.

Such articles can be manufactured through a variety of industrial processes well known in the art, such as for instance moulding, extrusion, and the like.

The term "polymer" as used in the present patent application also refers to polymers prepared by the polymerization of at least two different types of monomers. The generic term "polymer" thus includes the term "copolymers" (which is usually employed to refer to polymers prepared from two different monomers) as well as the term "terpolymers" (which is usually employed to refer to polymers prepared from three different types of monomers, e.g., a propylene-ethylene-butene polymer).

The term "pipe" as used herein also includes pipe fittings, valves and all parts which are commonly necessary for a piping system. Also included within the definition are mono- and multi-layer pipes, where for example one or more of the layers is a metal layer and which may include an adhesive layer.

In a further embodiment of the invention, the heterophasic polyolefin composition further comprises an inorganic filler agent in an amount ranging from 0.5 to 60 parts by weight with respect to 100 parts by weight of the said heterophasic polyolefin composition. Typical examples of such filler agents are calcium carbonate, barium sulphate, titanium bioxide and talc. Talc and calcium carbonate are preferred. A number of filler agents can also have a nucleating effect, such as talc that is also a nucleating agent. The amount of a nucleating agent is typically from 0.5 to 5 wt % with respect to the polymer amount.

As mentioned above, the heterophasic polyolefin composition of the invention comprises 1) a random copolymer of propylene and 2) a polymer of ethylene.

The random copolymer of propylene with 1-hexene comprises from 0.5 to 6% by weight of 1-hexene, preferably from 1 to 3% by weight of 1-hexene, even more preferably from 1.5 to 2.5% by weight of 1-hexene.

The random copolymer of propylene with 1-hexene typically has a polydispersity index (PI) ranging from 4 to 10, preferably from 5 to 6, and a MFR usually lower than 2, and preferably lower than 1 g/10 min.

The polymer of ethylene may contain a diene, conjugated or not, such as butadiene, 1,4-hexadiene, 1,5-hexadiene and ethylidene-norbornene-1. The diene, when present, is typically in an amount of from 0.5 to 10% by weight with respect to the weight of the ethylene polymer.

The polymer of ethylene typically has an ethylene content higher than 45% by weight, preferably comprised from 55 and 80% by weight, even more preferably comprised from 60 to 70% by weight.

The polymer of ethylene has intrinsic viscosity [η] values from 3 to 5 dl/g, preferably from 3 to 4.5 dl/g.

The MFR of the polymer of ethylene is usually lower than 2 and preferably lower than 1 g/10 min.

Furthermore, the intrinsic viscosity [η] of the polymer of ethylene fulfils the following relationship:

$$[\eta] < A \ast C,$$

wherein C is the ethylene content (percent by weight) of the polymer of ethylene and A is a constant equal to 0.085. Preferably, A is a constant equal to 0.060.

The heterophasic polyolefin composition of the present invention has a melt flow rate (MFR) value usually lower than 2, preferably lower than 1 and more preferably ranging from 0.5 to 0.8 g/10 min.

The heterophasic polyolefin composition exhibits a Charpy impact resistance value at −20° C. of 5 kJ/m² or higher, preferably 6 kJ/m² or higher.

Elongation at yield values of the heterophasic polyolefin composition of the invention are lower than 14%, preferably lower than 13%.

The heterophasic polyolefin composition of the invention shows an elongation at break higher than 400%, preferably higher than 450%, and a stress at break higher than 30 N/mm², preferably higher than 32 N/mm².

The said heterophasic polyolefin composition and the pressure pipes and other articles therefrom obtained, show a ductile to brittle transition temperature (DBTT) lower than −30° C., preferably lower than −35° C. Even more preferably, pressure pipes and other articles comprising the heterophasic polyolefin composition of the invention show a DBTT lower than −40° C.

The heterophasic polyolefin composition of the invention is also suitable for providing polypropylene pipes with walls of any configuration other than those with smooth inner and outer surface. Examples are pipes with a sandwich-like pipe wall, pipes with a hollow wall construction with longitudinally extending cavities, pipes with a hollow wall construction with spiral cavities, pipes with a smooth inner surface and a compact or hollow, spirally shaped, or an annularly ribbed outer surface, independently of the configuration of the respective pipe ends. Pipes and articles made from the heterophasic polyolefin composition of the invention also show very good creep and haze properties.

The heterophasic polyolefin composition may be prepared in accordance with the well-known polymerization processes.

The process for preparing the previously said heterophasic composition can be carried out by a sequential polymerization comprising at least two sequential steps, wherein components 1) and 2) are prepared in separate subsequent steps, operating in each step, except the first step, in the presence of the polymer formed and the catalyst used in the preceding step. The catalyst is preferably added only in the first step, because its activity is usually such that it is still active for all the subsequent steps. Component 1) is preferably prepared in a single polymerization stage. The order of the polymerization stages is not a critical process feature, however component 1) is preferably prepared before component 2).

The polymerisation can occur in liquid phase, gas phase or liquid-gas phase.

For example, it is possible to carry out the propylene polymerisation stage using liquid propylene as diluent, and the following copolymerisation stage in gas phase, without intermediate stages except for the partial degassing of the propylene.

Examples of suitable reactors are continuously operated stirred reactors, loop reactors, fluidized-bed reactors or horizontally or vertically stirred powder bed reactors. Of course, the reaction can also be carried out in a plurality of reactors connected in series.

It is possible to carry out the polymerisation in a cascade of stirred gas-phase reactors that are connected in series and in which the pulverulent reaction bed is kept in motion by means of a vertical stirrer. The reaction bed generally comprises the polymer that is polymerised in the respective reactor.

Propylene polymerisation to form component 1) is done in the presence of 1-hexene and optionally a minor amount of ethylene.

As previously said, the copolymerisation of ethylene with propylene (preferred) and/or other $C_4$-$C_{10}$ α-olefin(s) to form component 2) can occur in the presence of an above-mentioned diene.

Reaction time, pressure and temperature relative to the polymerisation steps are not critical, however it is best if the temperature is from 20 to 150° C., in particular from 50 to 100° C. The pressure can be atmospheric or higher.

The regulation of the molecular weight is carried out by using known regulators, hydrogen in particular.

According to a particularly preferred embodiment the said heterophasic polyolefin compositions are prepared by a sequential polymerization process comprising the preparation of component 1) in a first gas-phase polymerization apparatus comprising two interconnected polymerization zones and a second step in which the propylene, ethylenerich, copolymer is prepared by polymerizing the monomers in a separate fluidized bed reactor.

A gas-phase polymerization apparatus performing the first step of the process is illustrated in patent application EP-A1-782587.

In detail, the said process comprises feeding one or more monomer(s) to said polymerisation zones in the presence of catalyst under reaction conditions and collecting the polymer product from the said polymerisation zones. In said process the growing polymer particles flow upward through one (first) of the said polymerisation zones (riser) under fast fluidisation conditions, leave said riser and enter another (second) polymerisation zone (downcomer) through which they flow downward in a densified form under the action of gravity, leave said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it becomes possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, and is preferably from 0.8 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The control of the polymer circulating between the two polymerisation zones can be effected by metering the amount of polymer leaving the downcomer using means suitable for controlling the flow of solids, such as mechanical valves.

The operating parameters, such as the temperature, are those that are usual in gas-phase olefin polymerisation process, for example between 50 and 120° C.

The operating pressure can range between 0.5 and 10 MPa, preferably between 1.5 to 6 MPa.

Advantageously, at least one inert gas is maintained in the polymerisation zones, in such quantities that the sum of the partial pressures of the inert gases is preferably between 5 and 80% of the total pressure of the gas. The inert gas can be nitrogen or propane, for example.

The polymer leaving said first polymerization apparatus is discharged from the downcomer to a gas-solid separator then collected and transferred to the second stage which is preferably carried out in a conventional fluidized-bed gas-phase reactor operating under conventional conditions of temperature and pressure.

Preferably, the various catalyst components are fed to the riser at any point of the said riser. However, they can also be fed at any point of the downcomer. The catalyst can be in any physical state, therefore catalysts in either solid or liquid state can be used.

The preferred catalysts to be used in the present polymerization process are Ziegler-Natta catalysts comprising a solid catalyst component including a titanium compound having at least one titanium-halogen bond, and an electron-donor compound, both supported on a magnesium halide in active form as preferred support, optionally with silica as co-support.

Catalysts having the above mentioned characteristics are well known in the patent literature; particularly advantageous are the solid catalyst components used in the catalysts described in patent documents U.S. Pat. No. 4,399,054, EP-A2-045977 and EP-A2-395083.

The solid catalyst components used in the said catalysts comprise, as electron-donor compounds (internal electron-donor compounds), compounds selected from the group consisting of ethers, ketones, lactones, compounds containing N, P and/or S atoms, and esters of mono- and dicarboxylic acids. Particularly suitable electron-donor compounds are phthalic acid esters, such as diisobutyl, dioctyl, diphenyl and benzylbutyl phthalate, and esters of succinic acids.

Particularly suitable internal electron donor compounds are selected from succinates disclosed in international patent application WO-A1-00/63261. Preferably, succinates have formula (I) below:

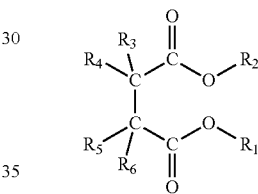

wherein the $R_1$ and $R_2$ radicals, equal to, or different from, each other are a $C_1$-$C_{20}$ linear or branched alkyl, alkenyl, cycloalkyl, aryl, arylalkyl or alkylaryl radical group, optionally containing heteroatoms; the $R_3$ to $R_6$ radicals equal to, or different from, each other, are hydrogen or a $C_1$-$C_{20}$ linear or branched alkyl, alkenyl, cycloalkyl, aryl, arylalkyl or alkylaryl radical group, optionally containing heteroatoms, and the $R_3$ to $R_6$ radicals which are joined to the same carbon atom can be linked together to form a cycle; with the proviso that when $R_3$ to $R_5$ radicals are contemporaneously hydrogen, $R_6$ is a radical selected from primary branched, secondary or tertiary alkyl, cycloalkyl, aryl, arylalkyl or alkylaryl radical groups having from 3 to 20 carbon atoms, or a linear alkyl radical group having at least four carbon atoms optionally containing heteroatoms.

$R_1$ and $R_2$ are preferably $C_1$-$C_8$ alkyl, cycloalkyl, aryl, arylalkyl and alkylaryl radical groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by formula (I) is that in which $R_3$ to $R_5$ radicals are hydrogen and $R_6$ is a branched alkyl, cycloalkyl, aryl, arylalkyl and alkylaryl radical having from 3 to 10 carbon atoms. Particularly preferred are the compounds in which $R_6$ is a branched primary alkyl group or a cycloalkyl group having from 3 to 10 carbon atoms. Specific examples are disclosed in the above-mentioned patent application.

Furthermore, also the compounds in which at least two radicals different from hydrogen are linked to different carbon atoms, that is $R_3$ and $R_5$ or $R_4$ and $R_6$ are particularly preferred. Preferred examples of such succinates to be used in the above said catalyst components are diethyl 2,3-bis(trimethylsilyl)succinate, diethyl 2,2-sec-butyl-3-methylsuccinate, diethyl 2-(3,3,3-trifluoropropyl)-3-methylsuccinate, diethyl 2,3-bis(2-ethylbutyl)succinate, diethyl 2,3-diethyl-2-isopropylsuccinate, diethyl 2,3-diisopropyl-2-methylsuccinate, diethyl 2,3-dicyclohexyl-2-methylsuccinate, diethyl 2,3-dibenzylsuccinate, diethyl 2,3-diisopropylsuccinate, diethyl 2,3-bis(cyclohexylmethyl)succinate, diethyl 2,3-di-t-butylsuccinate, diethyl 2,3-diisobutylsuccinate, diethyl 2,3-dineopentylsuccinate, diethyl 2,3-diisopentylsuccinate, diethyl 2,3-(1-trifluoromethyl-ethyl)succinate, diethyl 2,3-(9-fluorenyl)succinate, diethyl 2-isopropyl-3-isobutylsuccinate, diethyl 2-t-butyl-3-isopropylsuccinate, diethyl 2-isopropyl-3-cyclohexylsuccinate, diethyl 2-isopentyl-3-cyclohexylsuccinate, diethyl 2-cyclohexyl-3-cyclopentylsuccinate, diethyl 2,2,3,3-tetramethylsuccinate, diethyl 2,2,3,3-tetraethylsuccinate, diethyl 2,2,3,3-tetrapropylsuccinate, diethyl 2,3-diethyl-2,3-diisopropylsuccinate, diisobutyl 2,3 bis(trimethylsilyl)succinate, diisobutyl 2,2-sec-butyl-3-methylsuccinate, diisobutyl 2-(3,3,3-trifluoropropyl)-3-methylsuccinate, diisobutyl 2,3-bis(2-ethylbutyl)succinate, diisobutyl 2,3-diethyl-2-isopropylsuccinate, diisobutyl 2,3-diisopropyl-2-methylsuccinate, diisobutyl 2,3-dicyclohexyl-2-methylsuccinate, diisobutyl 2,3-dibenzylsuccinate, diisobutyl 2,3-diisopropylsuccinate, diisobutyl 2,3-bis(cyclohexylmethyl)succinate, diisobutyl 2,3-di-t-butylsuccinate, diisobutyl 2,3-diisobutylsuccinate, diisobutyl 2,3-dineopentylsuccinate, diisobutyl 2,3-diisopentylsuccinate, diisobutyl 2,3-(1,1,1-trifluoro-2-propyl)succinate, diisobutyl 2,3-n-propylsuccinate, diisobutyl 2,3-(9-fluorenyl)succinate, diisobutyl 2-isopropyl-3-ibutylsuccinate, diisobutyl 2-terbutyl-3-ipropylsuccinate, diisobutyl 2-isopropyl-3-cyclohexylsuccinate, diisobutyl 2-isopentyl-3-cyclohexylsuccinate, diisobutyl 2-n-propyl-3-(cyclohexylmethyl)succinate, diisobutyl 2-cyclohexyl-3-cyclopentylsuccinate, diisobutyl 2,2,3,3-tetramethylsuccinate, diisobutyl 2,2,3,3-tetraethylsuccinate, diisobutyl 2,2,3,3-tetrapropylsuccinate, diisobutyl 2,3-diethyl-2,3-diisopropylsuccinate, dineopentyl 2,3-bis(trimethylsilyl)succinate, dineopentyl 2,2-di-sec-butyl-3-methylsuccinate, dineopentyl 2-(3,3,3-trifluoropropyl)-3-methylsuccinate, dineopentyl 2,3 bis(2-ethylbutyl)succinate, dineopentyl 2,3-diethyl-2-isopropylsuccinate, dineopentyl 2,3-diisopropyl-2-methylsuccinate, dineopentyl 2,3-dicyclohexyl-2-methylsuccinate, dineopentyl 2,3-dibenzylsuccinate, dineopentyl 2,3-diisopropylsuccinate, dineopentyl 2,3-bis(cyclohexylmethyl)succinate, dineopentyl 2,3-di-t-butylsuccinate, dineopentyl 2,3-diisobutylsuccinate, dineopentyl 2,3-dineopentylsuccinate, dineopentyl 2,3-diisopentylsuccinate, dineopentyl 2,3-(1,1,1-trifluoro-2-propyl)succinate, dineopentyl 2,3-n-propylsuccinate, dineopentyl 2,3(9-fluorenyl)succinate, dineopentyl 2-isopropyl-3-isobutylsuccinate, dineopentyl 2-t-butyl-3-isopropylsuccinate, dineopentyl 2-isopropyl-3-cyclohexylsuccinate, dineopentyl 2-isopentyl-3-cyclohexylsuccinate, dineopentyl 2-n-propyl-3-(cyclohexylmethyl)succinate, dineopentyl 2-cyclohexyl-3-cyclopentylsuccinate, dineopentyl 2,2,3,3-tetramethylsuccinate, dineopentyl 2,2,3,3-tetraethylsuccinate, dineopentyl 2,2,3,3-tetrapropylsuccinate, dineopentyl 2,3-diethyl-2,3-diisopropylsuccinate.

Particularly preferred are diethyl 2,3-dibenzylsuccinate, diethyl 2,3-diisopropylsuccinate, diethyl 2,3-bis(cyclohexylmethyl)succinate, diethyl 2,3-diisobutylsuccinate, diethyl 2,3-(1-trifluoromethyl-ethyl)succinate, diisobutyl 2,3-dibenzylsuccinate, diisobutyl 2,3-diisopropylsuccinate, diisobutyl 2,3-bis(cyclohexylmethyl)succinate, diisobutyl 2,3-n-propylsuccinate, dineopentyl 2,3-diethyl-2-isopropylsuccinate, dineopentyl 2,3-diisopropyl-2-methylsuccinate, dineopentyl 2,3-dicyclohexyl-2-methylsuccinate, dineopentyl 2,3-dibenzylsuccinate, dineopentyl 2,3-diisopropylsuccinate, dineopentyl 2,3-bis(cyclohexylmethyl)succinate, dineopentyl 2,3-diisobutylsuccinate, dineopentyl 2,3-n-propylsuccinate, dineopentyl 2-isopropyl-3-cyclohexylsuccinate.

Other electron-donors particularly suitable are 1,3-diethers of formula:

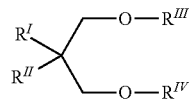

wherein $R^I$ and $R^{II}$ radicals are the same or different and are $C_1$-$C_{18}$ alkyl, $C_3$-$C_{18}$ cycloalkyl or $C_7$-$C_{18}$ aryl radicals; $R^{III}$ and $R^{IV}$ radicals are the same or different and are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations.

Ethers of this type are described, for example, in European patent applications EP-A1-361493 and EP-A1-728769.

Representative examples of said dieters are as follows: 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane and 9,9-bis (methoxymethyl)fluorene.

The preparation of the above mentioned catalyst components is carried out according to various methods. For example, a $MgCl_2 \cdot nROH$ adduct (in particular in the form of spherical particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared. In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide. The titanium compounds, which can be used for the preparation of the solid catalyst component, are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Ziegler-Natta catalysts also comprise a co-catalyst, i.e. an organoaluminum compound, such as an aluminum alkyl compound. An external donor is optionally added to the organoaluminium compound.

The Al-alkyl compounds used as co-catalysts comprise the Al-trialkyls, such as Al-triethyl, Al-triisobutyl, Al-tributyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates and in particular silicon compounds containing at least one Si—OR bond, where R is a hydrocarbon radical. Useful examples of silicon compounds are $(tert-butyl)_2Si(OCH_3)_2$, $(cyclopentyl)_2Si(OCH_3)_2$, $(cyclohexyl)(methyl)Si(OCH_3)_2$ and $(phenyl)_2Si(OCH_3)_2$.

1,3-diethers having the formulae described above can also be used advantageously.

If the internal donor is one of these dieters, the external donors can be omitted.

Prior to the polymerisation process, the catalysts can be precontacted with small quantities of olefins (prepolymerisation), thus improving both the performance of the catalysts and the morphology of the polymers. Prepolymerisation is carried out maintaining the catalysts in suspension in a hydrocarbon solvent (hexane or heptane, for example) and polymerising at a temperature from ambient to 60° C. for a time sufficient to produce quantities of polymer from 0.5 to 3 times the weight of the solid catalyst component. It can also be carried out in liquid propylene, at the temperature conditions indicated above, producing quantities of polymer that can reach up to 1000 g per g of catalyst component.

Articles, pressure pipes and related fittings according to the present invention are produced in a manner known per se, e.g. by (co-)extrusion or moulding, for instance.

Extrusion of articles can be made with different type of extruders for polyolefin, e.g. single or twin screw extruders.

A further embodiment of the present invention is a process wherein the said heterophasic polymer composition is moulded into said articles.

Due to high flowability of the polymer composition used the extrusion process requires lower pressure or temperatures in the die than that required when conventional olefin polymers are used even if they have higher melt flow rate. For example, the value of pressure can be reduced of about 10%.

When the pipes are multi-layer, at least one layer is made of the propylene polymer composition described above. The further layer(s) is/are preferably made of an amorphous or crystalline polymer (such as homopolymer and co- or terpolymer) of $R—CH=CH_2$ olefins, where R is a hydrogen atom or a $C_1-C_6$ alkyl radical. Particularly preferred are the following polymers:
1) isotactic or mainly isotactic propylene homopolymers;
2) random co- and terpolymers of propylene with ethylene and/or $C_4-C_8$ α-olefin, such as 1-butene, 1-hexene, 1-octene, 4-methyl-1-pentene, wherein the total comonomer content ranges from 0.05% to 20% by weight, or mixture of said polymers with isotactic or mainly isotactic propylene homopolymers;
3) heterophasic polymer blends comprising (a) a propylene homopolymer and/or one of the co- and terpolymers of item (2), and an elastomeric moiety (b) comprising co- and terpolymers of ethylene with propylene and/or a $C_4-C_8$ α-olefin, optionally containing minor amounts of a diene, the same disclosed for polymer (2)(a); and
4) amorphous polymers such as fluorinated polymers, polyvinyl difluoride (PVDF) for example.

In multi-layer pipes the layers of the pipe can have the same or different thickness.

The following examples are given to illustrate but not limit the present invention.

The following analytical methods were used to characterise the polymer compositions and the pressure pipes obtained therefrom.

Melt Flow Rate: measured according to ISO 1133 (230° C., 5 Kg).

[η] intrinsic viscosity: Determined in tetrahydronaphtalene at 135° C.

Xylene-soluble fraction (XS) at 25° C.: 2.5 g of polymer and 250 mL of o-xylene are introduced in a glass flask equipped with a refrigerator and a magnetical stirrer. The temperature is raised in 30 minutes up to the boiling point of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer.

Ethylene and 1-hexene content: Determined by I.R. Spectroscopy. The infrared spectrum of a pressed film of the polymer is recorded in absorbance vs. wavenumbers ($cm^{-1}$). The area of the combination band between 4482 and 3950 $cm^{-1}$ is used for spectrometric normalization of film thickness. A Partial Least Squares (PLS) calibration is applied to the range 790-760 cm-1 in order to determine ethylene and hexene % by weight.

Polidispersity Index (PI): measurement of molecular weight distribution in the polymer. Determined at a temperature of 200° C. by using a parallel plates rheometer model RMS-800 marketed by RHEOMETRICS (USA), operating at an oscillation frequency which increases from 0.1 rad/sec to 100 rad/sec. The value of the polydispersity index is derived from the crossover modulus by way of the equation:
P.I.=$10^5$/Gc
in which Gc is the crossover modulus defined as the value (expressed in Pa) at which G'=G" wherein G' is the storage modulus and G" is the loss modulus.

Elongation at yield: measured according to ISO 527.
Elongation at break: measured according To ISO 527
Stress at break: measured according to ISO 527.
Charpy impact resistance: measured according to ISO 527 (notched sample).
DBTT (ductile to brittle transition temperature): measured via a biaxial impact test by means of an impact tester equipped with the following features:
  Load cell with natural frequency equal to or greater than 15,000 Hz
  Capability to impact with a nominal energy of 16 J approx (5.3 Kg mass*30 cm falling height)
  Hemispheric impactor ½" diameter
  Specimen support 38 mm diameter
  Capability to integrate Force/Time curve
  DBTT Test Description:
Ten (10) 1.55*38 mm injection molded specimens are impacted at several different temperatures in order to find the 3 temperatures at which a ratio of 20-80%, 40-60%, 80-20%, respectively, of Brittle/Ductile failures occurs.

As Brittle failure is intended a failure absorbing a total energy equal to or lower than 2 Joules. The best interpolation curve is then traced between those 3 temperatures. The temperature where the event of 50% Brittle and 50% Ductile failures occurs is intended to represent the DBTT.

EXAMPLES

Preparation of the Solid Catalyst Component

Into a 500 mL four-necked round flask, purged with nitrogen, 250 ml of TiCl$_4$ are introduced at 0° C. While stirring, 10.0 g of microspheroidal MgCl$_2$.1.8C$_2$H$_5$OH (prepared according to the method described in ex.2 of U.S. Pat. No. 4,399,054 but operating at 3000 rpm instead of 10000 rpm) and 9.1 mmol of diethyl 2,3-(diisopropyl)succinate are added. The temperature is raised to 100° C. and maintained for 120 min. Then, the stirring is discontinued, the solid product was allowed to settle and the supernatant liquid is siphoned off. Then the following operations are repeated twice: 250 ml of fresh TiCl$_4$ are added, the mixture is reacted at 120° C. for 60 min and the supernatant liquid is siphoned off. The solid is washed six times with anhydrous hexane (6×100 mL) at 60° C.

Polymerization

The catalyst system was formed by the catalyst component prepared as described above, triethylaluminium (TEAL) as co-catalyst and dicyclopentyldimethoxysilane as external donor, with the weight ratios indicated in the following Tables.

The propylene polymer compositions of the examples were prepared in a two-step polymerization process, wherein the random copolymer 1) was prepared in the first polymerization step by feeding the monomers and the catalyst system into a gas-phase polymerization reactor comprising two interconnected polymerization zones, a riser and a downcomer, as described in the European Patent EP-A1-782587. The polymerization mixture was discharged from said reactor, conveyed to a gas-solid separator and the polymerized material was sent into a conventional gas-phase fluidized-bed reactor where the polymer of ethylene 2) was produced. The operative conditions are indicated in the Tables. The polymer particles exiting from the second polymerization step were subjected to a steam treatment to remove the unreacted monomers and dried.

Comparative Example (C.E.)

The catalyst system was formed by a solid catalyst component prepared according to the Example 5, lines 48-55 of the European Patent EP-A1-728769, triethylaluminium (TEAL) as co-catalyst and thexyltrimethoxysilane as external donor, with the weight ratios indicated in the following Tables.

Tables

|  | Ex. I | Ex. II | Ex. III | C.E. |
|---|---|---|---|---|
| TEA/Donor (g/g) | 30 | 30 | 30 | 7 |
| TEA/Catalyst (g/g) | 5 | 5 | 5 | 7 |

Component 1): Random Copolymer of Propylene with 1-hexene

| | Component 1) | | | |
|---|---|---|---|---|
| | Ex. I | Ex. II | Ex. III | C.E. |
| Temperature (° C.) | 83 | 83 | 83 | 85 |
| Pressure (MPa) | 2.4 | 2.4 | 2.4 | 2.4 |
| (1-hexene (% wt)[1] | 1.6 | 2.1 | 2.0 | 1.7 |
| PI | 5.9 | 5.2 | 5.2 | 5.5 |
| MFR (g/10 min) | 0.82 | 0.82 | 0.90 | 1.80 |

[1] percent by weight.

Component 2): Polymer of Ethylene

| | Component 2) | | | |
|---|---|---|---|---|
| | Ex. I | Ex. II | Ex. III | C.E. |
| Temperature (° C.) | 75 | 75 | 75 | 80 |
| Pressure (MPa) | 1.7 | 1.7 | 1.7 | 2.0 |
| C2 (% wt)[1] | 48 | 60 | 63 | 39 |
| [η] (dl/g) | 4.00 | 3.74 | 3.39 | 3.57 |
| MFR (g/10 min) | 0.70 | 0.97 | 0.68 | 1.50 |
| ([η])/(% C2) | 0.084 | 0.053 | 0.054 | 0.091 |

[1] percent by weight.

Heterophasic Polyolefin Composition

| | Ex. I | Ex. II | Ex. III | C.E. |
|---|---|---|---|---|
| Split[1] | 14 | 14 | 11.5 | 17 |
| DBTT (° C.) | −43.8 | −43.8 | −35.7 | −26.7 |
| Charpy (kJ/m$^2$) at −20° C. | 6.8 | 6.4 | 6.0 | 5.9 |
| MFR (g/10 min) | 0.52 | 0.72 | 0.65 | 0.84 |
| Elongation at yield (%) | 11.8 | 12.8 | 13.3 | 14.7 |
| Elongation at break (%) | 484 | 505 | 495 | 400 |
| Stress at break (N/mm$^2$) | 34.3 | 31.1 | 32.9 | 30.5 |

[1] Percentage amount of component 2) referred to the total polymer weight.

The invention claimed is:

1. A pipe comprising a heterophasic polyolefin composition, the heterophasic polyolefin composition comprising:
  1) 70-90% by weight of a random copolymer of propylene with 0.5-6% by weight of 1-hexene having a PI of from 5 to 6 and an MFR lower than 1 g/10 min.; and
  2) 10-30% by weight of a polymer of ethylene with a C$_3$-C$_{10}$ α-olefin; and optionally a diene,
  wherein the polymer of ethylene has an ethylene content higher than 45% by weight and an intrinsic viscosity [η] value from 3 to 5 dl/g, having the relationship:

$$[\eta] < A*C,$$

wherein C is the ethylene content, by percent by weight, of the polymer of ethylene and A is a constant equal to 0.085
  wherein the heterophasic polyolefin composition has a DBTT lower than −30° C.

2. The pipe of claim 1, wherein the random copolymer of propylene comprises from 1 to 3% by weight of 1-hexene.

3. The pipe of claim 1, wherein the polymer of ethylene has an ethylene content ranging from 55% to 80% by weight.

4. The pipe of claim 3, wherein the polymer of ethylene has an ethylene content ranging from 60% to 70% by weight.

5. The pipe of claim 1, wherein A is equal to 0.060.

6. A heterophasic polyolefin composition comprising:
1) 70-90% by weight of a random copolymer of propylene with 0.5-6% by weight of 1-hexene having a PI of from 5 to 6 and an MFR lower than 1 g/10 min.; and
2) 10-30% by weight of a polymer of ethylene with a $C_3$-$C_{10}$ α-olefin; and optionally a diene,
wherein the polymer of ethylene has an ethylene content higher than 45% by weight and an intrinsic viscosity [η] value from 3 to 5 dl/g, having the relationship:

$$[\eta] < A*C,$$

wherein C is the ethylene content, by percent by weight, of the polymer of ethylene and A is a constant equal to 0.085
wherein the heterophasic polyolefin composition has a DBTT lower than −30° C.

7. An article comprising a heterophasic polyolefin composition, the heterophasic polyolefin composition comprising:
1) 70-90% by weight of a random copolymer of propylene with 0.5-6% by weight of 1-hexene having a PI of from 5 to 6 and an MFR lower than 1 g/10 min.; and
2) 10-30% by weight of a polymer of ethylene with a $C_3$-$C_{10}$ α-olefin; and optionally a diene,
wherein the polymer of ethylene has an ethylene content higher than 45% by weight and an intrinsic viscosity [η] value from 3 to 5 dl/g, having the relationship:
$[\eta] < A*C,$
wherein C is the ethylene content, by percent by weight, of the polymer of ethylene and A is a constant equal to 0.085
wherein the heterophasic polyolefin composition has a DBTT lower than −30° C.

8. A process for producing an article comprising extruding and/or moulding a heterophasic polyolefin composition comprising:
1) 70-90% by weight of a random copolymer of propylene with 0.5-6% by weight of 1-hexene having a PI of from 5 to 6 and an MFR lower than 1 g/10 min.; and
2) 10-30% by weight of a polymer of ethylene with a $C_3$-$C_{10}$ α-olefin; and optionally a diene,
wherein the polymer of ethylene has an ethylene content higher than 45% by weight and an intrinsic viscosity [9η] value from 3 to 5 dl/g, having the relationship:
$[\eta] < A*C,$
wherein C is the ethylene content, by percent by weight, of the polymer of ethylene and A is a constant equal to 0.085
wherein the heterophasic composition has a DBTT lower than −30° C.

* * * * *